US006763392B1

(12) United States Patent
del Val et al.

(10) Patent No.: US 6,763,392 B1
(45) Date of Patent: Jul. 13, 2004

(54) MEDIA STREAMING METHODS AND ARRANGEMENTS

(75) Inventors: David del Val, Madrid (ES); William F. Schiefelbein, Sammamish, WA (US); Hemanth Ravi, Saratoga, CA (US); Anupam Sahai, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 09/676,128

(22) Filed: Sep. 29, 2000

(51) Int. Cl.[7] .............................................. G06F 13/00
(52) U.S. Cl. ...................................................... 709/231
(58) Field of Search ................................ 709/200, 227, 709/228, 230, 231, 232, 235, 238

(56) References Cited

U.S. PATENT DOCUMENTS

| | | | |
|---|---|---|---|
| 4,963,995 A | 10/1990 | Lang | 358/335 |
| 5,057,932 A | 10/1991 | Lang | 358/335 |
| 5,164,839 A | 11/1992 | Lang | 358/335 |
| 5,963,202 A | 10/1999 | Polish | 345/327 |
| 5,978,567 A | 11/1999 | Rebane et al. | 395/200.49 |
| 5,995,705 A | 11/1999 | Lang | 386/46 |

Primary Examiner—Robert B Harrell
(74) Attorney, Agent, or Firm—Lee & Hayes, PLLC

(57) ABSTRACT

Methods and arrangements are provided that integrate media streaming and Quality of Service (QoS) supportive protocols, such as, e.g., Real-Time Streaming Protocol (RTSP) and Resource Reservation Protocol (RSVP), respectively, in a manner that significantly reduces a session's startup latency as well as providing a higher quality of service that is experienced by an end user. The methods and arrangements selectively initiate the streaming of the media data as soon as possible, perhaps at an initially lower QoS, while simultaneously setting up a more desirable or applicable guaranteed QoS path. The methods and arrangements can be implemented in an intelligent manner to dynamically and/or selectively modify the streaming media in response to various network congestion problems, etc. A different/dynamic QoS capability may be setup during an existing streaming operation, and the streaming operation modified accordingly once the new QoS set-up has been completed. The methods and arrangements can provide such capabilities without significantly disturbing the user's experience.

28 Claims, 5 Drawing Sheets

* specifying options, such as, e.g., to wait for RESV before sending media data, never send best-effort, etc.

| Step | Direction | Action | Remark |
| --- | --- | --- | --- |
| 1 | C -> S | Create a RTSP control connection over TCP | |
| 2 | C -> S | Send RTSP SETUP request with the send best-effort data option for every stream in the program. | |
| 3. | C -> S | Send a RTSP SET_PARAMETER request to the server immediately after the SETUP message. | |
| 4 | S -> C | Open UDP data socket. Send RSVP PATH message. Send RTSP SETUP reply. | |
| 5 | C | Receive RTSP SETUP reply. | |
| 6 | C -> S | Send RTSP PLAY request. | |
| 7. | S -> C | Send RTSP PLAY reply. Send Data best-effort. | |
| 8. | C | Receive Data best-effort. | |
| 9. | C | Receive RSVP PATH message. | Client receives FD_QOS notification |
| 10. | C -> S | Send RSVP RESV message. | |
| 11. | S | Receive RSVP RESV message. Change setting to guaranteed. | |
| 12. | S -> C | Send RSVP RESV CONF message. Send Data guaranteed. | |
| 13. | C | Receive RSVP RESV CONF message. Receive Data. | FD_QOS notification |

Fig. 6

MEDIA STREAMING METHODS AND ARRANGEMENTS

TECHNICAL FIELD

This invention relates to computers and computer networks, and more particularly to methods and arrangements that significantly improve the media streaming experience for the end user and provide support for Quality of Service (QoS) features.

BACKGROUND

Computers and data communication networks are becoming increasing faster. One popular use for such high-speed devices and arrangements is to provide a stream of data associated with one or more forms of media. For example, many users of the Internet selectively download or "stream" video and/or audio data from other computers or servers. Applications are available to encode and stream the media data, and subsequently receive and play the streamed media data for the user. Thus, a user may watch an encoded/streamed television news program, receive real time investment information, listen to an encoded/streamed radio shows, etc., over a computer network.

Unfortunately, from time-to-time, users may experience an undesirable break in the streaming of the media data due to various reasons. For example, the network may become momentarily congested causing the loss of some of the streaming data. Much of this uncertainty can be resolved by adequately buffering streamed data on the receiving computer or like device. Another way to solve this problem is to provide dedicated or otherwise guaranteed data paths through the intervening network resources. These various resources can be configured to provide a defined level or quality of service (QoS) for the streaming data. This is usually accomplished to support applications that require two-way communications, such as multiple party conferencing applications, and the like.

In addition to breaks in the reception of the streamed media data, users are often subjected to an initial session startup latency or delay while the various supporting software and hardware systems exchange the applicable information necessary to set-up for the streaming of media data and start streaming/buffering media data.

The above problems and others associated with streaming media tend to degrade the overall end user experience. Consequently, there is a need for improved methods and arrangements that effectively reduce the startup latency and support QoS capabilities.

SUMMARY

In accordance with certain aspects of the present invention, improved methods and arrangements are provided that integrate media streaming and Quality of Service (QoS) supportive protocols, such as, e.g., Real-Time Streaming Protocol (RTSP) and Resource Reservation Protocol (RSVP), respectively, in a manner that significantly reduces the startup latency and improves the overall viewing experience by an end user.

For example, in certain implementations, the methods and arrangements essentially initiate the streaming of the media as soon as possible, perhaps at an initially lower QoS, while simultaneously setting up a more desirable or applicable QoS capability. The methods and arrangements may further be implemented in an intelligent manner to dynamically and/or selectively modify the streaming media in response to various network congestion problems, etc. Thus, a different/dynamic QoS capability may be setup during an existing streaming operation, and the streaming operation modified accordingly once the new QoS set-up has been completed. The various methods and arrangements provide such capabilities without significantly disturbing the user's experience.

BRIEF DESCRIPTION OF THE DRAWINGS

A more complete understanding of the various methods and arrangements of the present invention may be had by reference to the following detailed description when taken in conjunction with the accompanying drawings wherein:

FIG. 6 is a process table associated with the event-line graph of FIG. 5.

DETAILED DESCRIPTION

Figure 1:
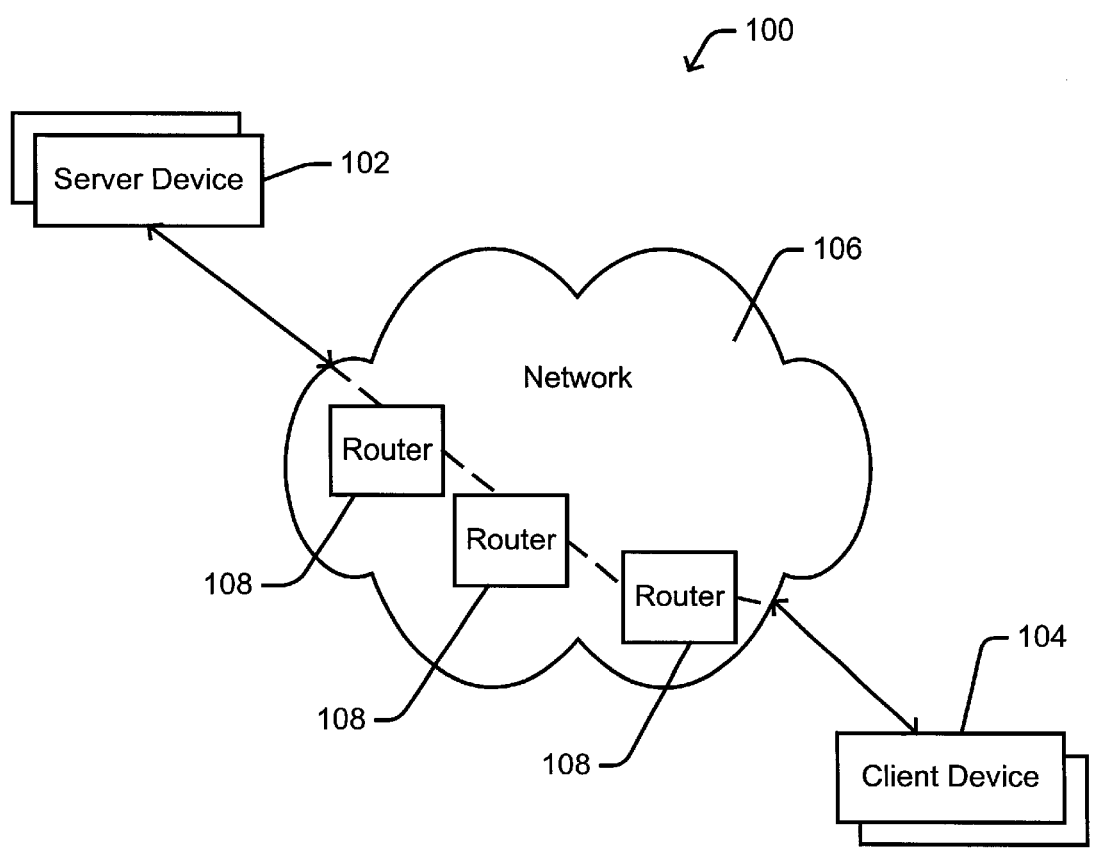
FIG. 1 is a block diagram depicting an exemplary client-server arrangement that is configurable to support media streaming from a server device to a client device, through an interconnecting network that provides selective Quality of Service (QoS) capabilities.

FIG. 1 is a block diagram depicting an exemplary client-server arrangement 100 that is configurable to support media streaming from at least one server device 102 to at least one client device 104, through at least one interconnecting network 106 that provides selective Quality of Service (QoS) capabilities.

As depicted in this simple arrangement, network 106 provides two-way communication between server device 102 and client device 104 through one or more routers 108 or like devices. Here, for example, network 106 may be a packet switched network that is configured to use Transmission Control Protocol/Internet Protocol (TCP/IP) to transfer information between server device 102 and client device 104 in packets appropriately addressed and delivered via the routers 108. Retransmission services are also provided for missing/corrupted packets. These and other well known protocols and techniques can be implemented to provide specific services between these communicating parties.

Figure 2:
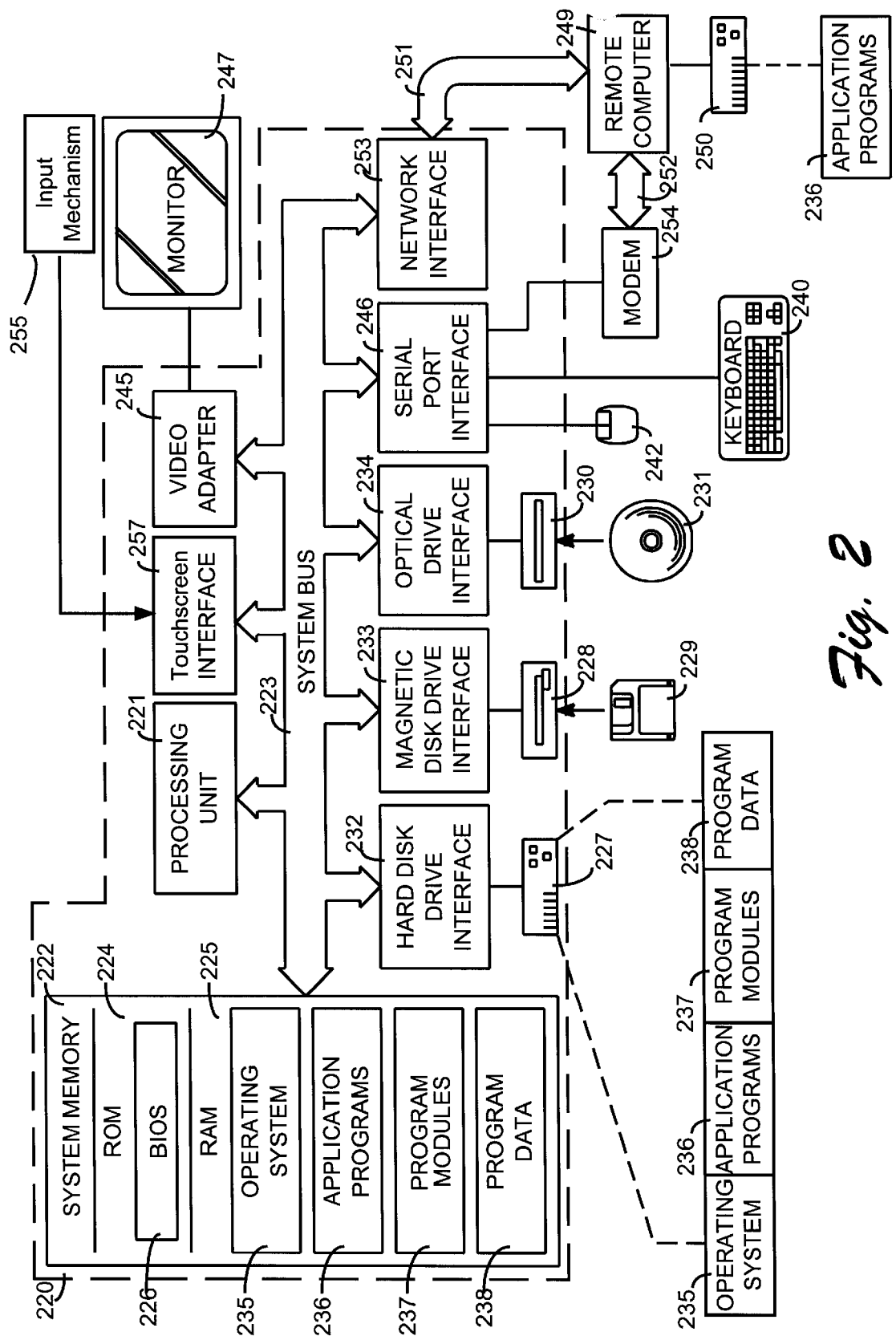
FIG. 2 is a block diagram depicting an exemplary computing system suitable for use as either a server device or as a client device in the arrangement of FIG. 1.

Attention is now drawn to FIG. 2, which is a block diagram depicting an exemplary computing system 200 suitable for use as either server device 102 or as client device 104. Computing system 200 is, in this example, in the form of a personal computer (PC), however, in other examples computing system may take the form of a dedicated server(s), a special-purpose device, an appliance, a handheld computing device, a cellular telephone device, a pager device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). Of particular significance to the present invention, a camera/microphone 255 or other like media device capable of capturing or otherwise outputting real-time data 256 can also be included as an input device to computing system 200. The real-time data 256 can be input into computing system 200 via an appropriate interface 257. Interface 257 can be connected to the system bus 223, thereby allowing real-time data 256 to be stored in RAM 225, or one of the other data storage devices, or otherwise processed.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

This description will now focus on certain aspects of the present invention that provide for improved streaming media sessions.

To establish and maintain a streaming media session, server device 102, client device 104 and any applicable devices within network 106 will require the implementation of appropriate communication protocols.

While this section of the document describes certain aspects of the invention through exemplary methods and arrangements that take advantage of well-known communication protocols and systems, this is by way of example only. Those skilled in the art will recognize that the methods and arrangements provided herein are readily adaptable for implementation using these and/or other known or future protocols and the like.

With this in mind, the following three related protocols are currently planned for streaming media data via the Internet or other like networks:

The first is a ReSerVation Protocol (RSVP), which is a network control protocol that deals with lower layer protocols having direct control over network resources. As such, RSVP is able to reserve network 106 resources as required to meet a specific QoS. RSVP does not, however, deliver any data itself. Instead, data delivery is accomplished by another protocol such as TCP/IP, User Datagram Protocol (UDP), Real-time Transport Protocol (RTP), or the like.

RTP is a transport layer protocol designed for transporting real-time data. Thus, RTP provides end-to-end delivery services, time stamping, sequence numbering, etc. To provide a specific QoS, RTP could rely on RVSP for resource reservation. Additional data quality and participant management can be provided through a Real-Time Control Protocol (RTCP), which is a control part of RTP.

The third protocol of interest with respect to arrangement 100 is a Real-Time Streaming Protocol (RTSP), which is an application layer control protocol that initiates and directs delivery of streaming media from server device 102 to client device 104. RTSP has been likened to a "network VCR remote control protocol" since it provides the client device application/user with the ability to play, pause, rewind, fast forward, etc. (as applicable to the type of media being streamed). The actual data delivery is done separately, most likely by RTP.

To provide a good end user experience, streaming media applications, such as, e.g., encoders, players and the like, require reservation of end-to-end networking resources during the streaming media session. The networking resources are needed to ensure the availability of enough bandwidth to support the traffic profile of the media data being streamed.

Thus, as described above, RSVP or other like protocols can be employed to reserve the required bandwidth based on a traffic profile; RTP or other like protocols can be employed to transport the streaming media over the reserved network resources; and, RTSP or other like protocols can be employed to promote a good user end experience by providing control over the streaming media.

One of the challenges facing streaming media applications and their underlying protocol stacks is the desire to provide the end user with a reasonably high-quality media data within a short amount of time following a command to begin a streaming media session.

Figure 3A:
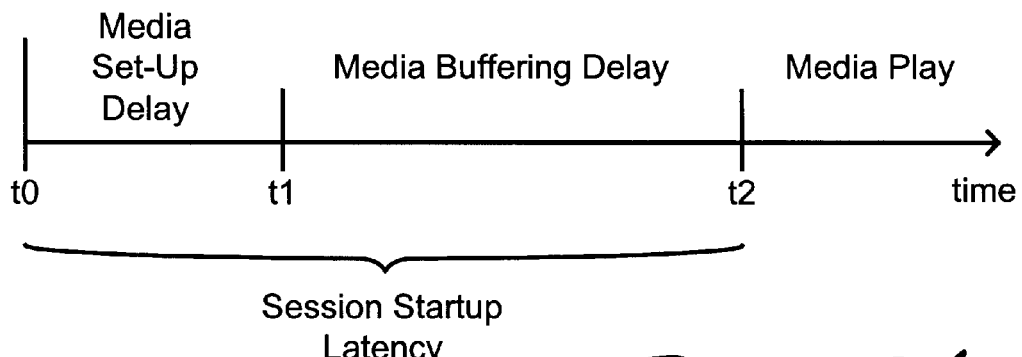
FIGS. 3(a–b) are time-line graphs that illustratively depict certain exemplary control-based delays associated with establishing a media-streaming session in the arrangement of FIG. 1 using known communication protocols.

With this in mind, FIG. 3a is an exemplary time-line graph illustrating certain exemplary control-based delays associated with establishing a media-streaming session using RTSP and RTP (i.e., no QoS provided). Here, at time t0, the end user (client device 104) initiates a streaming media session. From time t0 to time t1, server device 102 communicates, as needed, with client device 104 and routers 108 to begin the session. From time t1 through time t2, media data is being streamed from server device 102 through one or more routers 108 to client device 104, where the media data is buffered. At time t2, enough data has been buffered to begin the playing of the streamed media data to the end user.

One example of this type of streaming media session is the streaming of video and/or audio data over the Internet via the World Wide Web (WWW). It is not uncommon for end users to wait for several seconds, especially those communicating through lower bandwidth network resources, from when they initiate a streaming media session to when they see/hear the media played. This wait or session start-up latency tends to significantly reduce the end user's experience. Additionally, once established, the streaming media session will not usually have a guaranteed QoS associated with it (e.g., it will be sent best-effort).

Figure 3B:
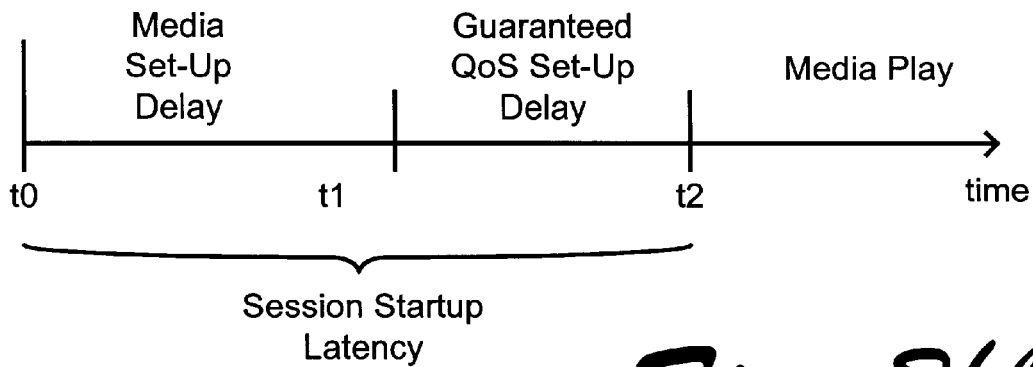

The time-line graph depicted in FIG. 3(b) illustrates similar delays associated with an exemplary streaming media session, in accordance with certain implementations of the present invention, that further includes a guaranteed QoS as established via RSVP. Here, at time t0, the end user (client device 104) initiates a streaming media session. From time t0 to time t1, server device 102 communicates, as needed (e.g., using RTSP and RTP), with client device 104 and routers 108 to begin the session. From time t1 through time t2, server device 102 further communicates/negotiates, as needed (e.g., using RSVP), with client device 104 and routers 108 to reserve the applicable network resources. At time t2, the media data is streamed with the desired QoS from server device 102 through a reserved network path (e.g., selected routers 108) to client device 104, where the media data can be immediately played for the end user.

Thus, as shown in FIG. 3(b), though the end user may experience a better overall QoS, there is still the need for the end user to wait for the media and QoS services to be set-up. In certain arrangements, such delays may reduce the effectiveness of the streaming media session and/or communicated media. Therefore, it would be even more desirable to reduce the session startup latency.

Figure 4:
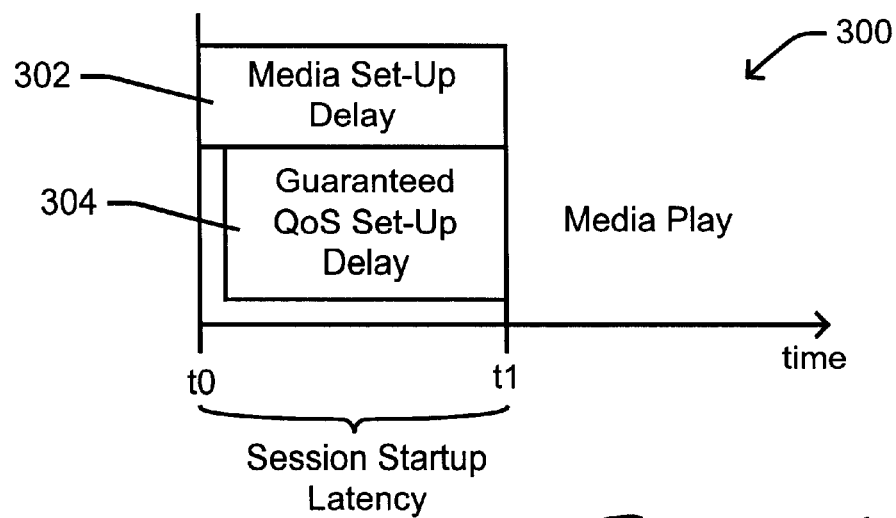
FIGS. 4 is time-line graph that illustratively depicts certain exemplary control-based delays associated with establishing a media-streaming session in the arrangement of FIG. 1 using exemplary techniques, in accordance with certain implementations of the present invention.

Attention is now directed towards FIG. 4, which is a time-line graph 300 that illustratively depicts the client-server arrangement of FIG. 1 establishing an exemplary media-streaming environment, in accordance with certain further implementations of the present invention.

As shown, a media set-up delay period 302 overlaps a QoS set-up delay period 304. The result is that the session startup latency experienced by the end user can be minimized or otherwise significantly reduced.

Continuing with the earlier example, in certain exemplary implementations, media set-up period 302 would include client device 104 and server device 102 exchanging RTSP commands/messages as needed to start or otherwise control the streaming media. QoS set-up period 304 would include the exchange of RSVP commands/messages as required to establish a guaranteed QoS connection.

Given the likelihood of variations as to when set-up periods 302 and 304 end (i.e., are completed), there are several options available for playing the streamed media.

Thus, for example, if both of set-up periods 302 and 304 end at about the same time, or if QoS set-up period 304 is completed prior to the end of media setup period 302, then the media data can be streamed over the RSVP negotiated path at the guaranteed QoS upon the completion of media set-up period 302.

On the other hand, if media set-up period 302 ends prior to the completion of QoS set-up period 304, then the media data may be: (1) streamed over non-RSVP path(s) until the RSVP negotiated path is ready (i.e., when QoS set-up period 304 ends), which may require that a portion of streamed media data be buffered by client device 104 before being played for the end user; or (2) delayed until the RSVP negotiated path is ready.

Given these choices, certain applications may be configured to allow the end user and/or the server administrator to select whether the streamed media is to be played as soon as possible, albeit in perhaps not in a preferred QoS format, or if the streamed media should not be played until it is in the preferred QoS format (e.g., high-enough quality, received via the RSVP negotiated path, etc.). Consequently, the end user may experience different delays and/or played media qualities at the beginning of a streamed media session.

By way of example, let us assume that an end user has selected to receive/play streamed video data as soon as possible, but would eventually like to have a guaranteed QoS. Let us further assume that, as a result of network congestion or other like causes, there will be delay of about five seconds between the end of media set-up period 302 and the end of QoS set-up period 304. Here, the video data might therefore begin streaming over network 106 using conventional "best effort" communications, momentarily accumulated/buffered by client device 104 (e.g., taking about two seconds), and subsequently played for the end user. Hence, following some delay, the end user will experience the first three seconds of the streaming video at a lower quality then desired. However, once the QoS set-up delay period 304 has ended and the RSVP negotiated path established, then the streaming video will be at the desired quality.

In the above examples, set-up delay periods 302 and 304 are essentially overlapping. However, depending upon the protocols being implemented, set-up delay periods 302 and 304 may be combined in an effort to further reduce the delay(s) experienced by the end user.

A brief overview of RSVP signaling follows. As described above, RSVP is a networking protocol dedicated to being the facilitator and carrier of standardized QoS information and parameters. RSVP carries generic (industry defined) QoS parameters from end nodes (inclusive) to each QoS-aware network device included in the hop path between RSVP session members. That is, RSVP provides a way for end nodes and network devices to communicate and negotiate QoS parameters and network usage admission.

Because RSVP is designed to carry resource reservation requests through networks of varying topologies and media, an end user's QoS request is propagated to all RSVP-aware network devices along the data path, allowing resources to be reserved from all of those which are RSVP-enabled, at all network levels. This tends to allow network 106 to meet the desired level of service.

RSVP reserves network resources by establishing flows end to end through network 106. A flow is basically a network path associated with one or more senders, one or more receivers, and a certain QoS. A sending host wishing to send data that requires a certain QoS will broadcast, via the QoS Service Provider, "PATH" messages toward the intended recipients. These path messages, which describe the bandwidth requirements and relevant parameters of the data to be sent, are propagated along the path.

A receiving host, interested in this particular data, will reserve the resources for the flow (and the network path) by sending "RESV" messages through the network back toward the sender. As this occurs, intermediate RSVP-capable nodes, based on bandwidth capacity and policies, decide whether or not to accept the proposed reservation and commit resources. If an affirmative decision is made, the resources are committed and RESV messages are propagated to the previous hop on the path from source to destination.

At the heart of the RSVP protocol is the exchange of PATH and RESV messages. The PATH message describes the QoS parameters of the traffic, the sender's address, and the destination of the traffic. The RESV message describes the QoS parameters of the traffic to be received and the source of the traffic and is sent toward the sender.

Upon receiving the RESV message, the QoS data flow begins. Typically, a QoS service provider constructs and periodically updates the PATH and RESV messages on behalf of the application. Sending applications, such as those controlling multicast transmissions, can also be configured to begin sending immediately on a best effort basis, which can then upgraded to QoS on receipt of the RESV message.

Figure 5:
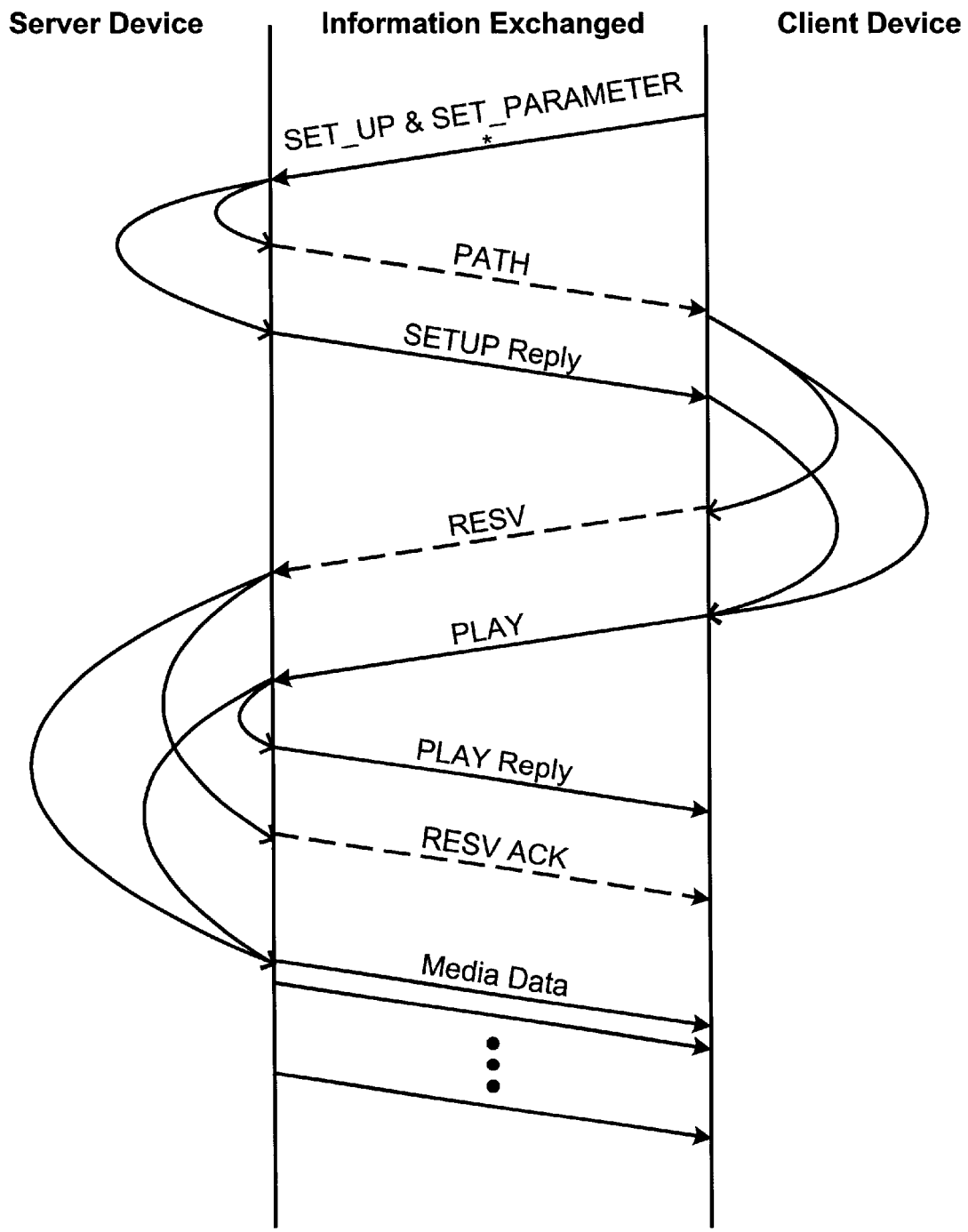
FIG. 5 is an event-line graph that illustratively depicts the client-server arrangement of FIG. 1 establishing an exemplary media-streaming session, in accordance with certain implementations of the present invention.

Reference is now made to the exemplary combined message flow in the event-line graph depicted in FIG. 5 and further summarized in an associated table in FIG. 6.

In this example, a RSVP enabled streaming media session is set-up by a sequence of RTSP messages and RSVP messages, depicted as solid-line arrows and dashed-line arrows, respectively, between client device 104 and server device 102. The curved arrows show the event dependencies for the various messages.

Client device 104 initiates the session set-up by sending RTSP SETUP commands, one for each media stream being set-up, to server device 102. After the last SETUP command, client device 104 sends an RTSP SET_PARAMETER command, which initiates the RSVP signaling. Upon receiving the SET_PARAMETER command, server device 102 sends out an RSVP PATH message. After sending the SET_PARAMETER command, client device 104 goes ahead and sends out the RTSP PLAY command, and server device 102 starts sending data upon receiving this PLAY command.

Upon receiving the PATH message, client device 104 sends an RSVP RESV message to server device 102, to which server device 102 replies with an RSVP RESV CONF message. The media data output by server device 102 is sent best effort until the RESV message is received. Once the RESV message is received, the streaming media data flow is changed to a guaranteed QoS.

A similar process is presented in the table depicted in FIG. 6. It should be noted that the listed steps may occur in a different ordering and/or that some of the steps may be left out of the process in other implementations/cases. Here, in the direction column, "C" represents client device 104, "S" represents server device 102, the presence of a pointer represents the direction information flow, the lack of a pointer represents that the action occurs within the identified device.

In the remark column, as noted, client device 104 may receive an FD_QOS notification with the available network bandwidth when it receives the PATH message from server device 102. If the available bandwidth is lower than the bandwidth requested by server device 102, then client device 104 may either continue the session without a reservation or otherwise terminate the request.

To further reduce the session startup latency in a LAN or other like environment wherein the network bandwidth is typically significantly greater than the streaming media requires, server device 102 may be configured to initially stream the data at a higher rate than the actual stream rate until client device's startup buffer is full. As such, client device 104 could start playing back the streamed media data earlier than as normally would be the case. A separate reliable (TCP) connection, for example, could be used to send the initial fast-start related media data from server device 102 to client device 104.

In such an accelerated streaming case, for example, client device 104 could reserve a bandwidth, which is equal to the highest bandwidth of the media stream data that can be requested by the client. The interaction of the server transmissions and the RSVP reservations happen in the same way as mentioned above for a normal media streaming case, except that the server side transmissions of data can also take place now at the accelerated bit rate.

This supports best effort streaming of the requested accelerated stream with greater than real-time bandwidth, for example, in case the current RSVP reservation is insufficient to support the requested bandwidth. This behavior of sending best-effort streams until the RSVP reservation is completed will be permitted in case the encoder/server configuration hasn't disabled a "Do best effort delivery in case RSVP reservation fails" (e.g., "Play as soon as possible") setting. Otherwise, server device 102 will wait for the RSVP reservation to be re-established and re-negotiate before resuming the data sending process.

The various aforementioned techniques also support dynamic communication changes associated an ongoing streaming media session. Thus, for example, RSVP or other like protocol signaling can be used to lower and/or raise the QoS associated the streaming media based on availability/congestion information from network 106.

For example, in the case that there is a need to switch streams to a lower bandwidth stream within a program due to network conditions, the initial reservation is left unchanged and a traffic shaping or similar function at server device 102 is changed to the new bandwidth. As long as the bandwidth is not greater than the initial reservation, server device 102 can configure the traffic shaping to different bandwidths without the need for any further RSVP signaling.

If there is a need to switch the stream bandwidth to a value higher than the currently negotiated value, then server device 102 will start sending the media data in best effort mode, while negotiating for a RSVP stream flow in parallel. This behavior of sending best-effort streams until the RSVP reservation is complete is permitted in case the encoder/server configuration hasn't disabled the "Do best effort delivery in case RSVP reservation fails" setting. Otherwise, server device 102 will wait for the RSVP reservation to be re-established and re-negotiated before sending data at the higher rate.

Support is also available for server side play lists that allow server device 102 to stream a plurality of media streams over the same data session one after another.

Similarly, client side play lists allow client device 104 to play different media streams one after another in a single play session.

The different streams in the play lists could have varying bandwidth requirements. As a result, there may be a need to change the reservation for each new stream. To make the switch seamless, a change in RSVP reservation can be made, for example, about 10 seconds in advance of the actual stream switch, whenever possible.

Thus, if the required bandwidth for the next item in the play list is lower than the currently negotiated bandwidth, then traffic shaping may be done on the server end to send the data without renegotiating the RSVP reservation for the flow. If the required bandwidth for the next item in the play list is higher than the currently negotiated bandwidth, then send best-effort media data until the RSVP reservation is complete. A parallel negotiation can occur for a RSVP connection, followed by a switch to a RSVP flow once the reservation comes through.

This behavior of sending best-effort streams until the RSVP reservation is complete will be permitted in case the encoder/server configuration hasn't disabled the "Do best effort delivery in case RSVP reservation fails" setting. Otherwise, server device 102 will wait for the RSVP reservation to be re-established and re-negotiated before resuming the data sending process for the next item in the play list.

The reservation for the new stream will be initiated, for example, about 10 seconds before the old stream ends. This would be at the time when server device 102 receives the SETUP for the new stream. The reservation for the new stream overrides the reservation for the old stream.

Server device 102 may also send out PATH messages by default for session less multicast sessions (done by default by the service provider). Once a client device 104 retrieves the announcement information, including the multicast address and port number information, it can then send out a RSVP RESV message to server device 102 requesting networking and host resources for the traffic profile. Thereafter, the server-client streaming media session progresses similar to the unicast cases described above. The various techniques also pertain to RTSP or other like protocol based session full-multicast support during multimedia streaming.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for initiating a streaming media transfer between a server device and a client device through at least one interconnecting network, the method comprising:
   selectively transferring an initial portion of a stream of data from a server device to a client device via a plurality of network resources;
   establishing a guaranteed quality of service path from the server device to the client device via a portion of the plurality of network resources; and
   selectively transferring a subsequent portion of the stream of data over the guaranteed quality of service path from the server device to the client device.

2. The method as recited in claim 1, wherein selectively transferring the initial stream of data from the server device to the client device further includes establishing a data connection using a first protocol, and wherein establishing the guaranteed quality of service path from the server device to the client device further includes establishing a guaranteed flow specification using a second protocol.

3. The method as recited in claim 2, wherein the first protocol includes a Real-Time Streaming Protocol (RTSP).

4. The method as recited in claim 2, wherein the second protocol includes a Resource Reservation Protocol (RSVP).

5. The method as recited in claim 1, wherein selectively transferring the initial stream of data from the server device to the client device occurs, at least partially, while establishing the guaranteed quality of service path from the server device to the client device.

6. The method as recited in claim 1, wherein selectively transferring the initial stream of data from the server device to the client device occurs until the guaranteed quality of service path from the server device to the client device has been established.

7. The method as recited in claim 1, wherein the initial portion of the stream of data is transferred over the plurality of network resources at a first level of quality of service, and the subsequent portion of the stream of data is transferred over the guaranteed quality of service path at a second level of quality of service that is higher than the first level of quality of service.

8. A computer-readable medium having computer-executable instructions for performing steps that initiate a streaming media transfer between a server device and a client device through at least one interconnecting network, the steps comprising:
   selectively transferring an initial portion of a stream of data from a server device to a client device via a plurality of network resources;
   establishing a guaranteed quality of service path from the server device to the client device via a portion of the plurality of network resources; and
   selectively transferring a subsequent portion of the stream of data over the guaranteed quality of service path from the server device to the client device.

9. The computer-readable medium as recited in claim 8, wherein selectively transferring the initial stream of data from the server device to the client device further includes establishing a data connection using a first protocol, and wherein establishing the guaranteed quality of service path from the server device to the client device further includes establishing a guaranteed flow specification using a second protocol.

10. The computer-readable medium as recited in claim 9, wherein the first protocol includes a Real-Time Streaming Protocol (RTSP).

11. The computer-readable medium as recited in claim 9, wherein the second protocol includes a Resource Reservation Protocol (RSVP).

12. The computer-readable medium as recited in claim 8, wherein selectively transferring the initial stream of data from the server device to the client device occurs, at least partially, while establishing the guaranteed quality of service path from the server device to the client device.

13. The computer-readable medium as recited in claim 8, wherein selectively transferring the initial stream of data from the server device to the client device occurs until the guaranteed quality of service path from the server device to the client device has been established.

14. The computer-readable medium as recited in claim 8, wherein the initial portion of the stream of data is transferred over the plurality of network resources at a first level of quality of service, and the subsequent portion of the stream of data is transferred over the guaranteed quality of service path at a second level of quality of service that is higher than the first level of quality of service.

15. A server device suitable for use in initiating a streaming media transfer to a client device through at least one interconnecting network, the server device comprising:

memory containing at least a portion of a stream of data; and logic operatively coupled to the memory and configurable to selectively output an initial portion of the stream of data from the memory to a client device, support the establishment of a guaranteed quality of service path to the client device; and selectively output a subsequent portion of the stream of data over the guaranteed quality of service path to the client device.

16. The server device as recited in claim 15, wherein the logic is further configurable to establish a data connection using a first protocol, and a guaranteed flow specification using a second protocol.

17. The server device as recited in claim 16, wherein the first protocol includes a Real-Time Streaming Protocol (RTSP).

18. The server device as recited in claim 16, wherein the second protocol includes a Resource Reservation Protocol (RSVP).

19. The server device as recited in claim 15, wherein the logic is further configurable to simultaneously transfer the initial stream of data to the client device and establish the guaranteed quality of service path.

20. The server device as recited in claim 15, wherein the logic is further configurable to transfer the initial stream of data to the client device until the guaranteed quality of service path to the client device has been established.

21. The server device as recited in claim 15, wherein the logic is configurable to transfer the initial portion of the stream of data at a first level of quality of service, and the subsequent portion of the stream of data at a second level of quality of service that is higher than the first level of quality of service.

22. A client device suitable for use in initiating a streaming media transfer from a server device through at least one interconnecting network, the client device comprising:

memory suitable for containing at least a portion of a stream of data; and logic operatively coupled to the memory and configurable to selectively receive an initial portion of the stream of data from the server device, support the establishment of a guaranteed quality of service path from the server device; and selectively receive a subsequent portion of the stream of data over the guaranteed quality of service path from the server device.

23. The client device as recited in claim 22, wherein the logic is further configurable to establish a data connection using a first protocol, and a guaranteed flow specification using a second protocol.

24. The client device as recited in claim 23, wherein the first protocol includes a Real-Time Streaming Protocol (RTSP).

25. The client device as recited in claim 23, wherein the second protocol includes a Resource Reservation Protocol (RSVP).

26. The client device as recited in claim 22, wherein the logic is further configurable to simultaneously receive the initial stream of data from the server device and establish the guaranteed quality of service path.

27. The client device as recited in claim 22, wherein the logic is further configurable to receive the initial stream of data from the server device until the guaranteed quality of service path from the server device has been established.

28. The client device as recited in claim 22, wherein the logic is configurable to receive the initial portion of the stream of data at a first level of quality of service, and the subsequent portion of the stream of data at a second level of quality of service that is higher than the first level of quality of service.

* * * * *